J. DENEEN.
CHAIN SAW.
APPLICATION FILED APR. 7, 1914.
1,116,574.
Patented Nov. 10, 1914.
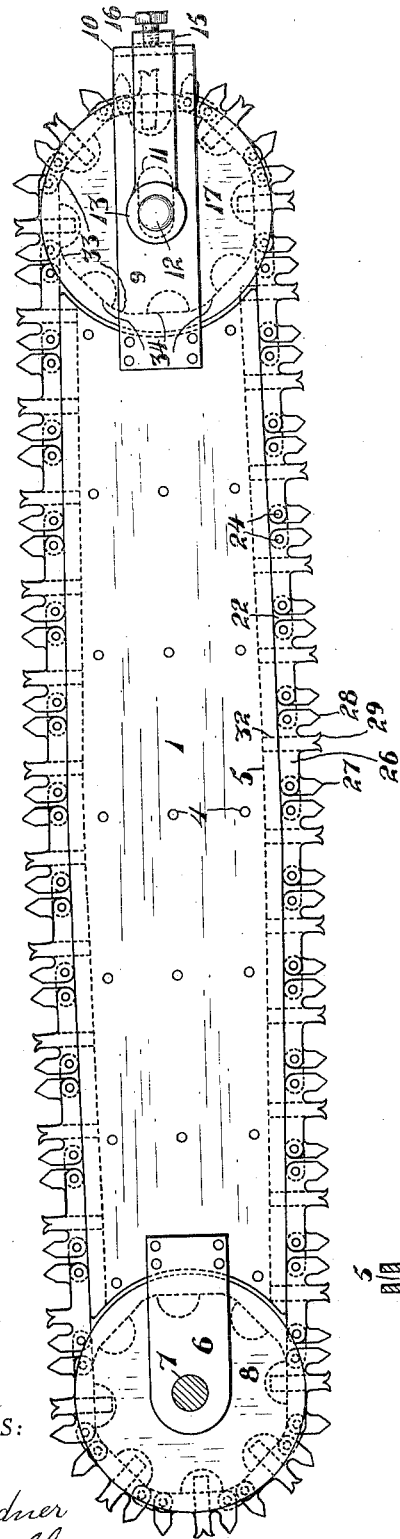
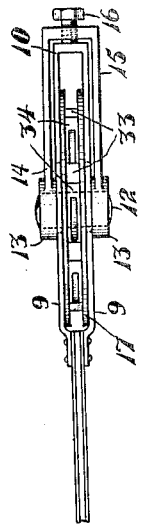
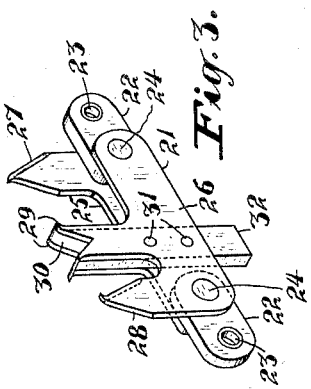
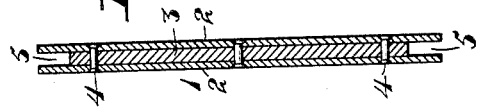
WITNESSES:
INVENTOR.
John Deneen
ATTORNEY

UNITED STATES PATENT OFFICE.

JOHN DENEEN, OF GREENVILLE, CALIFORNIA.

CHAIN SAW.

1,116,574.    Specification of Letters Patent.    Patented Nov. 10, 1914.

Application filed April 7, 1914. Serial No. 830,154.

*To all whom it may concern:*

Be it known that I, JOHN DENEEN, a citizen of the United States, residing at Greenville, in the county of Plumas and State of California, have invented new and useful Improvements in Chain Saws, of which the following is a specification.

The present invention relates to improvements in chain saws especially in that class of chain saws traveling around a frame and adapted to be operated by power and to be used in cutting down standing timber and cutting it up into logs.

The object of the invention is to provide a saw which will cut more effectively than heretofore, in which the saw dust will be more effectually cleared out of the cut made by the saw, and in which the saw will be better guided in the frame around which it travels.

In the accompanying drawing, Figure 1 is a side view of the chain saw; Fig. 2 is a broken plan view of one end of the frame for the saw; Fig. 3 is a perspective view of a link of the saw; Fig. 4 is a cross-sectional view of the frame.

Referring to the drawing, 1 indicates a long frame comprising two side pieces 2, and a middle piece 3, secured thereto by rivets 4, and of less width than the side pieces, so as to form on each side grooves 5 to guide a chain saw. At one end of the frame are secured thereto brackets 6 through holes in which passes a power shaft 7, carrying between said brackets a driven wheel 8, having a peripheral groove to receive the chain saw as hereinafter explained. At the other end are secured two members 9 of a yoke 10, said members being longitudinally slotted, as shown at 11, to receive therethrough a shaft 12 rotating in bearings 13 secured on the end of members 14 of a yoke 15, through which is screwed a screw 16 abutting against the end of the yoke 10, whereby the distance from the shaft 7 of the shaft 12 can be lengthened or shortened as required. On said shaft 12 is mounted an idler wheel 17 of the same construction as the driven wheel 8.

The chain saw consists of alternately long and short links 21, 22, the short links 22 having each two pivot holes 23 through which, and holes in the ends of long links, pass pivot pins 24 to connect the links together in an endless chain. Each long link 21 comprises two plates 25, 26, between which the short links 22 are pivoted. Each plate has a single cutting tooth, the cutting tooth 27 on the plate 25 being at the forward end of the link, and the cutting tooth 28 of the plate 26 being at the rear end of the link. Both cutting teeth 27, 28 are beveled on their inner forward cutting edges. Each of the plates 25, 26 has a clearing tooth section 29, the section 29 of the plates 26 being nearer to the cutting tooth 28 of said section than the section 29 of the plate 25 is to the cutting tooth 27. Between these two clearing tooth sections 29 is contained an intermediate clearing tooth section 30, formed of a separate piece of metal of the same thickness as the distance between said plates 25, 26. All three sections are riveted together by rivets 31. The intermediate clearing tooth section is extended beyond the backs of said plates, as shown at 32, to form a guide, said guides 32 traveling in the grooves 4 in the frame. The central portion of the wheels 8 and 17, forming the bottoms of the grooves in said wheels, are polygonal in form, having short sides 33 and long sides 34 corresponding in length to the short links 22 and the long links 21. Each long side of the polygon is formed with a central depression to receive closely fitting therein the extension 32, so that said chain is accurately guided in its passage around the wheels.

I regard as important features of my present invention, first, the arrangement of the cutting teeth, in relation to the clearing tooth, one on the link next in advance of the clearing tooth and the other on the same link as the clearing tooth, said cutting teeth being on opposite sides of the chain saw; second, the form of the clearing tooth, which, by the interposition of the intermediate clearing tooth section, is of the full width of the chain saw, and therefore effectually clears the sawdust from the cut; third, the extension 32 from the clearing tooth section, said extension traveling in the grooves in the frame and depressions in the wheels while the backs of the links travel upon the edges of the frame, said section 32 thus serving to accurately guide the chain saw in its movement with reference to the frame.

I claim:—

1. A chain saw having links movably connected in an endless series, each link having a clearing tooth and two plates, each plate having a cutting tooth, one of said cutting teeth being in front of the clearing tooth and the other behind it.

2. A chain saw having links, each consisting of two plates, said plates having clearing tooth sections and an intermediate clearing tooth section, all of said sections being riveted together.

3. A chain saw having links, each consisting of two plates, said plates having clearing tooth sections and an intermediate clearing tooth section, all of said sections being riveted together, one plate having a single cutting tooth in advance of said clearing tooth, and the other plate having a cutting tooth behind said clearing tooth.

4. A chain saw having links, each consisting of two plates, said plates having clearing tooth sections and an intermediate clearing tooth section, all of said sections being riveted together, said intermediate section having an extension past the backs of the two plates.

In testimony whereof I have hereunto set my hand in the presence of two subscribing witnesses.

JOHN DENEEN.

Witnesses:
F. M. Wright,
D. B. Richards.